United States Patent
Lovitt

(10) Patent No.: US 10,154,360 B2
(45) Date of Patent: Dec. 11, 2018

(54) METHOD AND SYSTEM OF IMPROVING DETECTION OF ENVIRONMENTAL SOUNDS IN AN IMMERSIVE ENVIRONMENT

(71) Applicant: MICROSOFT TECHNOLOGY LICENSING, LLC, Redmond, WA (US)

(72) Inventor: Andrew William Lovitt, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 15/589,986

(22) Filed: May 8, 2017

(65) Prior Publication Data
US 2018/0324539 A1 Nov. 8, 2018

(51) Int. Cl.
*H04S 5/00* (2006.01)
*H04S 1/00* (2006.01)
*G02B 27/01* (2006.01)
*G06T 19/00* (2011.01)
*G02B 27/22* (2018.01)

(52) U.S. Cl.
CPC ............. *H04S 5/00* (2013.01); *G02B 27/017* (2013.01); *G02B 27/22* (2013.01); *G06T 19/006* (2013.01); *H04S 1/00* (2013.01); *G02B 2027/0178* (2013.01)

(58) Field of Classification Search
CPC .... H04S 2400/11; H04S 2420/01; H04S 5/00; H04S 7/302
See application file for complete search history.

(56) References Cited

U.S. PATENT DOCUMENTS

| | | | |
|---|---|---|---|
| 6,396,509 B1 | 5/2002 | Cheng | |
| 8,082,297 B2 | 12/2011 | Syvain et al. | |
| 8,315,409 B2 | 11/2012 | Amsterdam et al. | |
| 8,520,872 B2 | 8/2013 | Jang et al. | |
| 8,902,050 B2* | 12/2014 | Heubel | G06F 3/011 340/407.1 |
| 9,275,626 B2 | 3/2016 | Benson et al. | |
| 9,384,737 B2 | 7/2016 | Lamb et al. | |
| 9,465,283 B2 | 10/2016 | Ferren et al. | |
| 9,530,426 B1 | 12/2016 | Wright et al. | |
| 9,641,805 B2* | 5/2017 | Wilson | H04N 7/157 |

(Continued)

OTHER PUBLICATIONS

Kastrenakes, Jacob, "Sony's new headphones cancel noise, but not people's voices", http://www.theverge.com/2016/9/1/12734848/sony-headphones-noise-cancellation-lets-voices-through, Published on: Sep. 1, 2016, 5 pages.

*Primary Examiner* — Mohammad Islam
(74) *Attorney, Agent, or Firm* — NovoTechIP International PLLC

(57) ABSTRACT

An improved method and system for enhancing a user's experience within an immersive environment is disclosed. Solutions and implementations provided improve the user's ability to both hear and identify sounds from outside the user's immersive experience. Implementations include receiving audio and sensor input from the environment, analyzing the received input and adjusting either the display or audio outputs generated for the user based in part on pre-determined policies.

19 Claims, 7 Drawing Sheets

(56) References Cited

U.S. PATENT DOCUMENTS

| | | |
|---|---|---|
| 2009/0240359 A1 | 9/2009 | Hyndman et al. |
| 2012/0136270 A1* | 5/2012 | Leuthardt ............ A61B 5/0484 600/532 |
| 2012/0188237 A1* | 7/2012 | Han ........................ A63F 13/10 345/419 |
| 2014/0063055 A1* | 3/2014 | Osterhout ............... G06F 3/005 345/633 |
| 2014/0314261 A1* | 10/2014 | Selig ...................... H04R 25/50 381/314 |
| 2014/0316192 A1* | 10/2014 | de Zambotti ......... A61M 21/02 600/28 |
| 2015/0187206 A1* | 7/2015 | Saurin ..................... G08C 17/02 340/5.61 |
| 2015/0302655 A1 | 10/2015 | Miller et al. |
| 2015/0309316 A1* | 10/2015 | Osterhout ............... G06F 1/163 345/8 |
| 2015/0312677 A1* | 10/2015 | Kraft ..................... H04R 1/1083 381/72 |
| 2015/0355880 A1* | 12/2015 | Kraft ....................... G06F 3/165 700/94 |
| 2015/0373474 A1* | 12/2015 | Kraft ..................... H04R 1/1083 381/17 |
| 2015/0379335 A1* | 12/2015 | Marlow ............. G06K 9/00369 382/203 |
| 2016/0127815 A1* | 5/2016 | Ookuri ..................... H04R 1/06 381/119 |
| 2016/0142820 A1* | 5/2016 | Kraft ..................... H04R 1/1083 381/94.3 |
| 2016/0173049 A1* | 6/2016 | Mehta ...................... H03G 3/32 381/57 |
| 2016/0209648 A1* | 7/2016 | Haddick ............ G02B 27/0093 |
| 2017/0094143 A1* | 3/2017 | Hellier ................... H04N 5/232 |
| 2017/0148339 A1* | 5/2017 | Van Curen ............. G09B 9/003 |
| 2017/0269901 A1* | 9/2017 | Klimanis ................ G06F 3/165 |
| 2018/0014140 A1* | 1/2018 | Milevski ................. H04S 7/304 |

\* cited by examiner

METHOD AND SYSTEM OF IMPROVING DETECTION OF ENVIRONMENTAL SOUNDS IN AN IMMERSIVE ENVIRONMENT

TECHNICAL FIELD

This disclosure relates generally to improving user detection of environmental sounds in an immersive environment and, more particularly, to adjusting one or more parameters of a received audio signal and/or one or more parameters of a virtual agent to improve the detection of environmental sounds by a user.

BACKGROUND

In general, devices that provide virtual reality (VR), augmented reality (AR), or mixed reality (MR) generate environments where the user's attention may be solely on the reality provided to them by the device. These environments are sometimes called immersive as they provide a world within which the users can immerse themselves. While in such an environment, the user may not be able to notice and pay attention to the real world around them as their entire attention is focused on the immersive environment. For example, users may not be able to hear ambient sounds from the environment or if they hear such sounds, they may not notice them. This is particularly true as immersive environments often generate sounds and images that occlude both visual and auditory information from the real-world environment.

SUMMARY

Apparatuses and methods of improving a user's experience in an immersive environment are described. Methods can include receiving an audio signal from an ambient environment, analyzing the received audio signal to identify one or more parameters for the received audio signal, determining a classification level based at least in part on one of the one or more identified parameters of the received audio signal and one or more predetermined policies, determining, at least in part based on the classification level, if an adjustment is needed in the immersive environment to improve the user's experience, and adjusting a relationship between a virtual agent in the immersive environment and at least one of the one or more parameters.

In at least one implementation, disclosed methods can include receiving an audio signal from an ambient environment, analyzing the received audio signal to identify one or more parameters for the received audio signal, receiving a sensor signal from the ambient environment, accessing a policy database to identify one or more policies related to at least one of the one or more parameters or the received sensor signal, determining, at least in part based on the identified policy, if an adjustment is needed in the immersive environment to improve the user's experience, and adjusting a relationship between a virtual agent in the immersive environment and at least one of the one or more parameters.

Disclosed apparatuses include an apparatus that includes a microphone for receiving an audio signal, a display panel for displaying a virtual agent, a speaker for transmitting an output audio signal, a processing unit, and a memory. In one embodiment, the memory is readable by the processing unit and includes instructions stored on it that can cause the processing unit to receive an audio signal from an ambient environment, analyze the received audio signal to identify one or more parameters for the received audio signal, determine a classification level based at least in part on one of the one or more identified parameters of the received audio signal and one or more predetermined policies, determine, at least in part based on the classification level, if an adjustment is needed in the immersive environment to improve the user's experience, and adjust a relationship between a virtual agent in the immersive environment and at least one of the one or more parameters.

This Summary is provided to introduce a selection of concepts in a simplified form that are further described below in the Detailed Description. This Summary is, not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the disclosed subject matter. It will be apparent to persons of ordinary skill, upon reading this description, that various aspects can be practiced without such details.

One potential negative side effect of providing an immersive environment for a user is that the environment may occupy the user's attention entirely. While this can be a desirable feature if the user is engaged in listening to music, playing a video game, or watching a movie, it could also mean that the user is unable to hear ambient sounds from the user's environment that require his/her attention. This is particularly true as the users fill their environment with holograms and other information. Spatial information, audio or otherwise, is generally very important for humans in fusing auditory streams. As virtual objects fill the user's space they may occlude visual and/or auditory information thus creating confusion or preventing the user from hearing certain sounds. For example, a person using a head-mounted display (HMD) device may be inhibited from hearing sounds relating to potential safety hazards such as fire alarm sounders or crying, babies, and other sounds that while not urgent may still be important, such as doorbells or other people wishing to gain the person's attention.

In the present implementations, various techniques are used to utilize information from the environment to detect when the virtual environment is in conflict with the ambient environment and non-intrusively adjust either the virtual environment and/or an output audio signal relating to the real-world to gain user's attention.

As will be understood by persons of skill in the art upon reading this disclosure, benefits and advantages provided by such implementations can include, but are not limited to, a solution to the problem of user confusion and inability to hear and/or notice ambient sounds in an immersive environment. Solutions and implementations provided here improve the user's ability to both hear and identify sounds from outside the user's immersive environment, thus enhancing the user's overall experience. Implementations include, receiving audio and sensor input from the environment, analyzing the received input and adjusting either the display and/or audio outputs generated for the user based in part on pre-determined policies.

Figure 1:
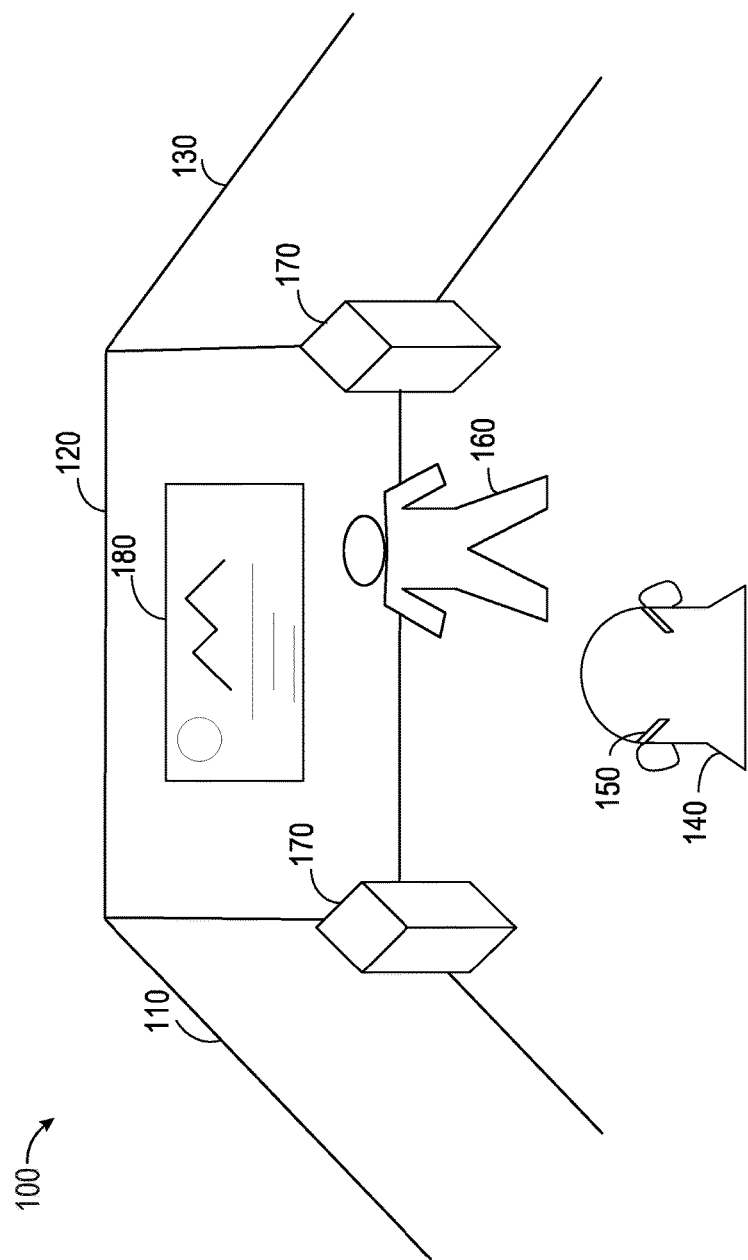
FIG. 1 illustrates a block diagram of an example immersive environment, in accordance with one or more aspects of the present application.

Referring now to the drawings, FIG. 1 schematic illustrates an example immersive environment, in accordance with one or more aspects of the present application. Immersive environment 100 includes, among other features, a left side wall 110, a front wall 120 and a right side wall 130. It should be noted that although FIG. 1 illustrates an immersive environment in an indoor environment, the techniques described herein may be used in other environments including outdoor environments. An immersive environment is generated, in one implementation, by a head-mounted display device 150 worn by a user 140. The head-mounted display 150 can display one or more virtual objects for the user 140 within the immersive environment which, in one implementation, interact with the user 140. One such object is illustrated in FIG. 1, as a virtual agent 160. In one embodiment, the virtual agent 160 is a hologram that can verbally communicate with the user 140 through the head-mounted display 150. In one implementation, the virtual agent 160 is also mobile around the experience (i.e., moves around the immersive environment 100), as needed.

The example immersive environment 100 also includes, in one implementation, a display device 180 positioned on the front wall 120. The display device 180 can be a television, a computer monitor or any other display screen. As shown, two speakers 170 are also located within the immersive environment 100. In one implementation, the speakers are connected to the display device 180 to generate sound in association with the display device 180. Alternatively, the speakers may be connected to the head-mounted display 150. Although, only two speakers 170 are shown in FIG. 1, one or more additional speakers may be utilized in an immersive environment. For example, more speakers may be positioned behind the user 140 to create a surround sound environment. Though FIG. 1 illustrates the head-mounted display 150 as the device that generates the immersive environment, other alternatives are also contemplated. For example, in one embodiment, virtual objects are generated and displayed by a projector. In such a configuration, a surround speaker system may be utilized along with the projector and one or more additional devices (e.g., a gaming console) that measure the environment to create the immersive experience and provide improved detection of environmental sounds by the user. Other configurations are also possible. For example, in one implementation, a surround speaker system is used along with a project and another device having a microphone (such as a mobile telephone) to communicate with a cloud-based processor to generate the immersive environment and improve detection of ambient sound.

Figure 2:
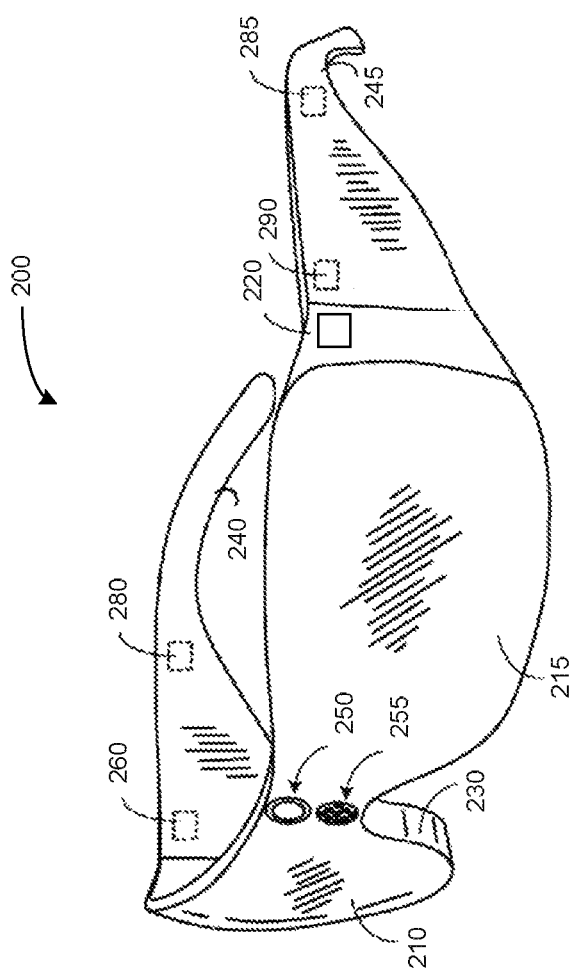
FIG. 2 illustrates a diagram of an example head-mounted display device configured to provide an immersive environment for a user, in accordance with one or more aspects of the present application.

FIG. 2 illustrates an example head-mounted display device 200 which can be utilized to create an immersive environment, in accordance with one or more aspects of the present application. In one implementation, the head-mounted display device 200 is a wearable, head-mounted augmented reality, virtual reality, or mixed-reality device that is worn by a user. In the illustrated example, the head-mounted display 200 takes the form of eyeglasses and includes a nose rest 230 and left and right ear rests 240 and 245. In other implementations, the display device may take the form of a helmet, hat, or wearable device visor with an in-front-of-the-face see-through visor.

In at least some implantations, the head-mounted display device 200 includes a right display panel 210 for viewing by the user's right eye and a left display panel 215 for viewing by the user's left eye. Thus, the right display panel 210 is configured to display virtual objects at right-eye display coordinates, while the left display panel 215 is configured to display virtual objects at left-eye display coordinates. Alternatively, a single display panel can be used that extends over both the right and left eyes of the user, providing a common display that is shared by both eyes. In one implementation, the display panels 210 and 215 are at least partially transparent so the user can view the physical space of the real-world environment through the display panels. In such a configuration, the user can view virtual objects that do not exist within the physical space along, with physical objects within the real-world environment. This creates an appearance that the virtual objects are physically present within the physical space. In this manner, the head-mounted display device 200 can create an illusion that virtual objects move within the physical space.

In one embodiment, the head-mounted display device 200 includes, among other features, a right side microphone 260 and a left side microphone 290 to receive audio input from the ambient environment. The two microphones are each positioned on one of the ear rests (on two opposing sides of the head-mounted display device 200) to provide spatial-diversity on the display device 200.

In one implementation, the head-mounted display device 200 also includes a right side audio speaker 280 and a left side audio speaker 285. Two speakers 280 and 285 are positioned on the two opposing sides of the head-mounted display device 200 to provide stereo sound effects. Such a system can provide the user with the perception that virtual sounds are positioned at virtualized real-world positions within the physical space. Alternatively, the head-mounted display device 200 may be connected to and utilize off-board speakers such as speakers 170 illustrated in FIG. 1.

In at least some implementations, the head-mounted display device 200 also includes a variety of on-board sensors for measuring the real-world environment. These sensors include a forward-facing camera 250 for observing the physical space and a rearward-facing camera 255 for tracking the user's eye movements. The head-mounted display 200 may include one or more additional sensors 220, which in one embodiment, is an accelerometer configured to identify orientation, motion or acceleration of the head-mounted display device 200. Thus, by using the microphones and the sensors, the head-mounted display device 200 can continuously measure and receive input from the ambient environment and the user. Additionally, the display panels and the speakers enable the head-mounted display device 200 to respond to real-world sounds and inputs by adjusting the virtual objects displayed or the sounds generated through the speakers.

Figure 3:
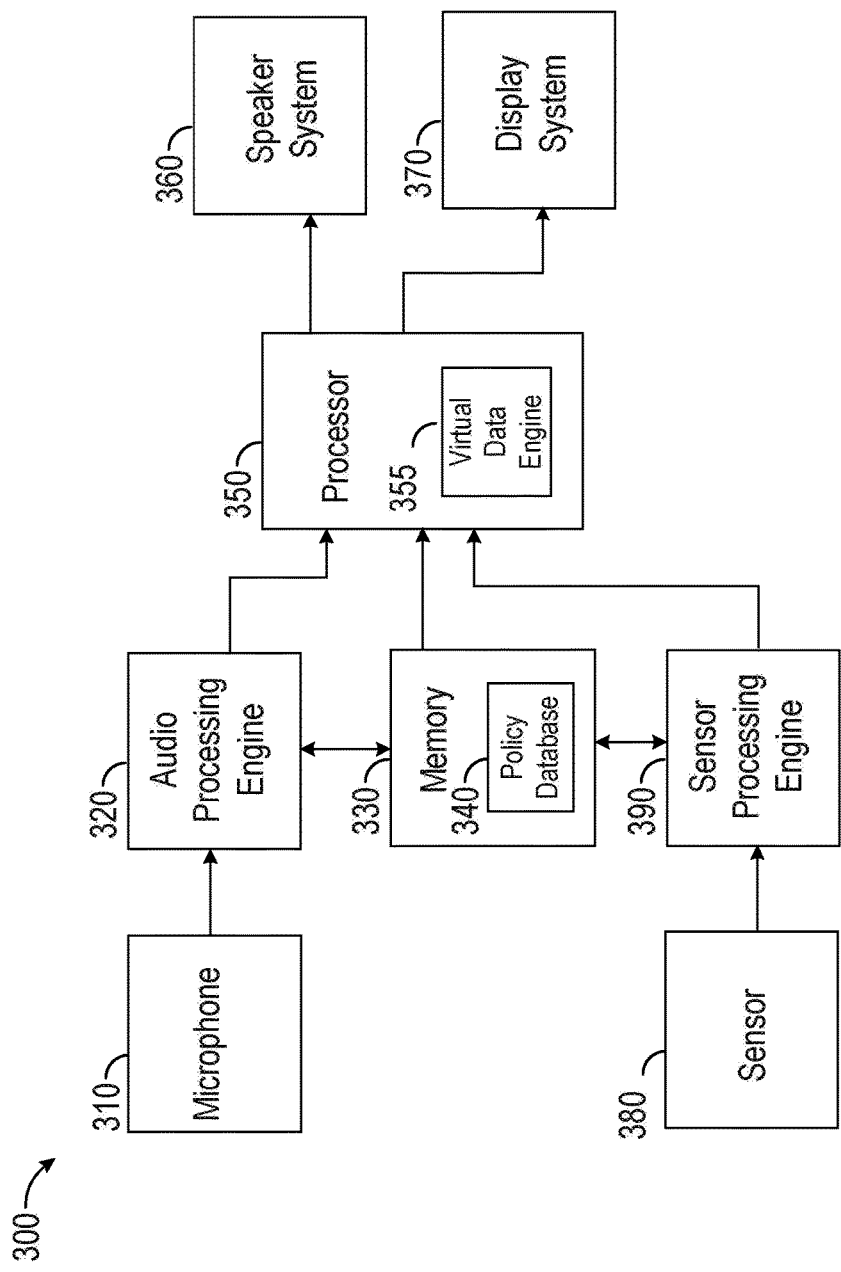
FIG. 3 illustrates a block diagram of a system configured to provide improved detection of environmental sounds in an immersive environment, in accordance with one or more aspects of the present application.

FIG. 3 illustrates an exemplary block diagram for a system 300 providing improved detection of environmental sounds in an immersive environment. In one implementation, system 300 includes at least one microphone 310. The microphone 310 enables the system 300 to continuously listen for environmental sounds and capture audio signals from the environment when there is ambient sound in the vicinity of the system. It should be noted that although, only one microphone is shown in FIG. 3, in at least one embodiment, two or more microphones are used. In one such implementation, the microphones are arranged in a layout and used to capture sounds from various directions and originating from different points within an environment. The layout of the microphones may be predetermined, or in at least one embodiment, may be movable. Ambient sounds may be captured as analog signals and digitized through the use of an analog-to-digital converter. Once converted to digital, the audio signals are transmitted by the microphone 310 to an audio processing engine 320.

In one implementation, the audio processing engine 320 analyzes the received audio signals to identify one or more parameters for the signals. These parameters may include volume, resolution, bandwidth, and frequency. In at least one implementation, the audio processing engine 320 also analyzes the audio signal to identify the source from which the sound originated. For example, the audio processing engine may apply audio and voice recognition techniques to detect a particular sound. This is done in one embodiment, by identifying certain parameters of the received audio signals and comparing those to previously stored parameters in a memory 330 of the system 300, which is in communication with the audio processing engine 320. The identified parameters are then transmitted to a processor 350 for further processing, as discussed below. The parameters transmitted to the processor 350 may include noise level, echo level, and ambient noise level. In one embodiment, ambient noise level is the level of background noise in the environment, while the noise level is the level of sounds in the room with a higher volume than that of the background noise. For example, when multiple people are present in a room and talking, the ambient noise is the constant murmur of voices in the room, whereas the noise level may be a phone ringing in the room.

The system 300 also includes one or more sensors 380 for capturing video, image, motion, orientation, position, acceleration, and other similar information about the environment and/or the user's interaction with the environment. These sensors 380 may include one or more cameras, accelerometers, motion sensors, and the like. In one embodiment, the sensors 380 are positioned in a predetermined layout and used to capture signals from various points within an environment. This is done to help the system 300 continuously measure the real-world environment around the user.

After being captured, signals from the one or more sensors 380 are transmitted to a sensor processing engine 390. Although shown as separate units, in at least one implementation, the sensor processing engine 390 is integrated with the audio, processing engine 320 into one unit. In one embodiment, the sensor processing engine 390 processes video, image, motion and accelerometer data to assist in continuously measuring the environment, identifying objects, and detecting and tracking the location and orientation of various objects in relation to the user. In at least one implantation, the sensor processing engine 390 executes image and audio processing algorithms such as object recognition and facial recognition techniques to identify objects and people in the environment. For example, object recognition may be used to detect particular objects such as a baby monitor, TV, or door, while facial recognition may be used to detect the face of a particular person in the room.

Information obtained through the analysis performed by the sensor processing engine 390 is transmitted, in one implementation, to the processor 350 for further processing. The processor 350 may include one or more processors for executing computer readable instructions stored in memory 330 in order to perform processes discussed herein. Although shown as separate units, in at least one implementation, the processor 350 is integrated with the audio processing engine 320 and/or the sensor processing engine 390 into one unit. In one configuration, the processor 350 itself includes one or more other processors that are configured to execute specific software instructions. Additionally, the processor 350 may include one or more hardware or firmware logic units configured to execute hardware or firmware instructions. The processor 350 may be single core or multicore, and the programs executed thereon may be configured for parallel or distributed processing. The processor 350 may optionally include individual components that are distributed throughout two or more devices, which may be remotely located and/or configured for coordinated processing. One or more aspects of the processor 350 may be virtualized and executed by remotely accessible networked computing devices configured in a cloud computing configuration. Furthermore, the processor 350 may make use of computing platforms based on DSP/FPGA (Digital Signal Processing/Field Programmable Gate Array) systems, and the like, which may not have an operating system.

In one embodiment, processor 350 receives inputs from both the audio processing engine 320 and sensor processing engine 390 to process and analyze the audio signals received in light of information received from the sensor processing engine 390 about the user's environment. This analysis may include determining the distance and orientation of a source of audio signal with respect to the user, determining if this distance and orientation is changing, and determining (e.g., based on the user's eye movement and/or head movement) whether or not the user detected a particular sound. Such information is then compared, in one embodiment, with information stored in memory 330 and analyzed based on pre-determined policies stored in a policy database 340 of memory 330 to decide if any changes need to be made to the output audio and/or video signals presented to the user in the immersive environment.

The policy database 340 contains, in one implementation, a set of predetermined rules that dictate how to categorize and prioritize certain audio sounds. For example, one rule might dictate that ambient sound is always prioritized over virtual sounds. Alternatively, specific ambient sounds may be given different levels of priority, and in some instances levels of priority may be specified with respect to specific virtual sounds. For example, television may be classified as low priority and doorbell may be categorized as medium priority, whereas baby monitor or fire alarm may be labeled as high priority. However, a specific TV program may be given higher priority over music being played in the virtual environment. In another implementation, the rules may dictate under what conditions ambient sound is prioritized over virtual sound and/display. For example, a policy might state that if the user is inside a room with the TV on, the sound from the TV is low priority, while if the user walks into a room with the TV on, the TV sound takes priority. Another policy might require that certain sounds be localized correctly whereas others need not be. Another example rule may dictate that if there are other people in the room while the user is engaged in an activity in the immersive environment, the activity has higher priority over the people's voice, while if the group of people enters the room, their voices should have higher priority over the immersive environment. Other policies may require that certain frequencies or echo levels of an ambient sound be selected for amplification to decrease sound confusion or to prioritize certain sounds over others. Various other types of policies are also contemplated. The policies may be pre-set by the system and may be adjustable by the user.

Referring again to FIG. 3, the processor 350 includes, in at least one implementation, a virtual data engine 355 for processing virtual objects and registering the position and orientation of virtual objects in relation to the user and various identified real-world objects to determine if any changes need to be made to any of the virtual objects.

As shown in FIG. 3, memory 330 is in communication with audio processing engine 320, sensor processing engine 390 and processor 350. The communication may be wired or wireless and it may be direct or through one or more additional devices. Memory 330 may include removable media and/or built-in devices. For example, memory 330 may include optical memory devices (e.g., CD, DVD, HD-DVD, Blu-Ray Disc, etc.), semiconductor memory devices (e.g., RAM, EPROM, EEPROM, etc.) and/or magnetic memory devices (e.g., hard disk drive, floppy disk drive, tape drive, MRAM, etc.), among others. Memory 330 may also include devices with one or more of the following characteristics: volatile, nonvolatile, dynamic, static, read/write, read-only, random access, sequential access, location addressable, file addressable, and content addressable.

In some implementations, the audio processing engine 320, the sensor processing engine 390, and/or the processor 350 may be integrated into one or more common devices, such as an application specific integrated circuit or a system on a chip. Furthermore, memory 330 may be a part of a storage device that is accessed remotely, through wired or wireless communication. For example, memory 330 take form of a cloud computing configuration.

As shown in FIG. 3, system 300 also includes a speaker system 360 and a display system 370, both of which are communicatively coupled to the processor 350. The speaker system 360 may include one or more speakers that are located strategically either within a single device (e.g., a head-mounted display system) or around a room such that they can create a surround stereo experience for the user. The speaker system 360 receives input signals from the processor 350 and generates output audio signals accordingly. The display system 370 includes, in one implementation, one or more display screens designed to display virtual objects and agents. The display system 370 also receives instructions from the processor 350 that direct when and if certain virtual objects need to be moved or modified to enhance the user's experience within the immersive environment.

Figure 4:
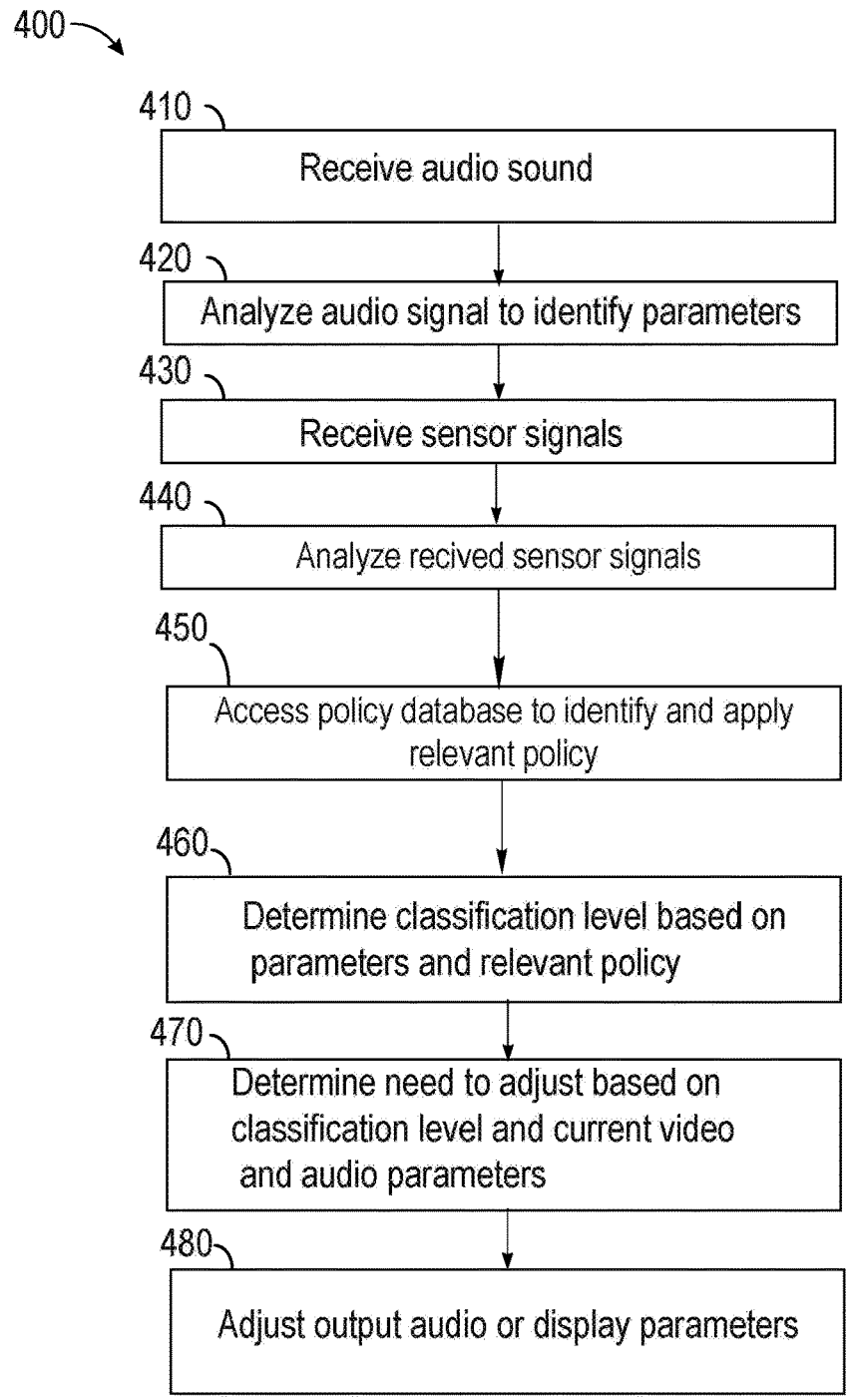
FIG. 4 illustrates a flow chart for a process that provides improved detection of environmental sounds in an immersive environment, in accordance with one or more aspects of the present application.

FIG. 4 is a flow diagram depicting an example method 400 for improving detection of ambient sounds within an immersive environment, which may be performed, for example, using the system 300 illustrated in FIG. 3. At 410, the method 400 includes receiving audio sounds from the ambient environment. Audio sounds may include any audio signal that is generated in the real-world in the vicinity of the system 300. In one implementation, the audio sounds are received and captured by one or more microphones such as the microphone 310 of FIG. 3. This means, in at least in one implementation, the method 400 is constantly listening to the ambient environment and receiving audio signals when and if there is a sound. In another implementation, the system may not be constantly listening. Instead, it may periodically wake up to listen for changes or may simply just listen to see if there is a significant change. This can be used particularly for environments in which the sounds do not change very often. In such a system, historical information may be used to determine noise level, echo level, and the like, instead of performing a complete sound decomposition of the entire field continuously. For example, if the user is in a coffee shop, there is background noise that changes but not too much, the system may use historical information to measure the sound field instead of performing a complete sound decomposition.

However, because not all real-world sounds are equally important to the user of the immersive environment, the signals may need to be examined to identify certain characteristics that can help determine if any changes need to be made to enhance the user's ability to hear those sounds. As such, at 420 the method 400 includes analyzing, the received audio signals to identify certain parameters of the signals. In one implementation, these parameters include at least one of amplitude (volume), frequency, bandwidth, resolution, and a source for the audio signal. The source may be identified by using voice recognition algorithms and referring to previously stored information in a memory, such as memory 330 of FIG. 3. The analysis is performed, in one implementation, by an audio processing engine such as the audio processing engine 320 of FIG. 3. Alternatively, the analysis can be performed by any known processor or logic system.

In addition to receiving audio signals, the method 400 receives, at 430, one or more sensor signals from sensors configured to capture and/or measure one or more parameters of the real-world environment surrounding the user. For example, the sensor signals may include images, videos, motion information and accelerometer data about the user and/or one or more objects or people within the user's vicinity. This information is designed to assist the method 400 examine the user's environment before deciding whether or not output audio or video signals need to be modified to enhance the user's experience. This is done, in one implementation, at 440 of method 400, by analyzing the received sensor signals to identify certain parameters, characteristics, and/or objects in the environment. For example, facial recognition and object recognition algorithms may be used to identify certain people and/or objects. The information gathered from the analysis helps determine if and how changes need to be made to the output signals to improve the user's ability to hear ambient sounds. For example, a video tracking the user's eye movements and/or head movement may indicate that the user has already heard an ambient sound, thus obviating the need for making any changes to the output audio signal. On the other hand, motion and accelerometer information may show that the user is engaged in physical exercise or playing a video game, thus making it less likely that the user is able to notice ambient environmental sounds. Object recognition may help determine sources of additional distraction for the user. For example, existence of a TV may indicate that the user is preoccupied by not only the immersive environment but also watching TV.

In at least one implementation, information from object recognition algorithms used at step 440 may be used to help identify the source of an audio signal at step 420. This may be useful in instances when analyzing the audio signal by itself is not, enough to distinguish the sound and identify its source. For example, some doorbells chimes sound like songs. It may not be immediately clear to the system whether the song is being played from a TV or speaker system or from the doorbell. By identifying the door, the method 400 can help narrow down the choices in identifying the source of the ambient sound.

At 450, the method 400 includes accessing the policy database to identify and apply policies relevant to the audio signal being processed. This is performed, in one implementation, by a processor such as the processor 350 of FIG. 3. The process involves comparing certain identifying parameters of the pertinent audio signal (e.g., source, volume, location) and the current recognized conditions of the user's environment (e.g., if the user is playing a video game, if they have already heard the sound, if they are watching TV, etc.) to the set of rules in the policy database to determine if the database contains any applicable rules. Once applicable rules are identified, the method 400 applies the identified rules to determine, at 460, a classification level for the audio sound being processed. The classification levels, in one implementation, include three tiers: low, medium, or high priority. In an alternative implementation, the classification levels may be based on a numbering system that can go from one to ten or more. Other known classification systems may be used in other configurations.

At 470, the method 400 determines the need to adjust one or more parameters of either the output audio signals, the video signals, a relationship between those signals or a combination. This determination is made, in one implementation based on the classification level given to the audio signal along with currently identified video and audio parameters. For example, if the received audio signal is that of a ringing phone, and the rules dictate that the phone trumps all virtual audio signals except for when a book is being read to the user, the method 400 may classify the ringing phone as high priority but still decide to decrease the volume of the book being read or modify the ringing sound because it has determined that the virtual sound is that of a book being read by a virtual agent. In another example, the sound of a certain person speaking may be classified as high priority (e.g., the sound of the user's spouse is considered high priority whereas the sound of the neighbor speaking is considered low priority) and, in at least one implementation, the rules may also require that the sound be localized correctly, thus requiring the need to know the distance and orientation of the speaker with respect to the user. In yet another example, the policies may require that the TV be classified as low priority when the user is listening to music, thus obviating the need for adjusting the audio output as long as music is being played for the user or requiring that the volume for the music be increased so that the TV noise does not interfere with the music.

At 480, method 400 adjusts output audio and/or video display parameters based on the determination made at the previous step. This may involve, in one implementation, modifying one or more parameters of the output audio signal. These parameters include volume, frequency, bandwidth, or resolution, among others. For example, the method 400 may amplify the volume of the received ambient sound while it reduces the volume of a virtual agent speaking. Alternatively, modification of the sounds could be frequency specific. For example, if a virtual agent has a lower voice or the user is playing a racing game with low frequency acoustic energy, the method may selectively amplify the upper frequencies causing the user to hear them more clearly as opposed to amplifying all frequencies and creating a more confusing auditory scene. Adjusting the output audio and/or video display parameters may also involve changing the location of the audio sound and/or virtual objects, as discussed below with respect to FIGS. 5-7. In one implementation, adjusting the parameters includes adjusting a relationship between one or more virtual objects and one or more parameters of the ambient audio sound.

Figure 5:
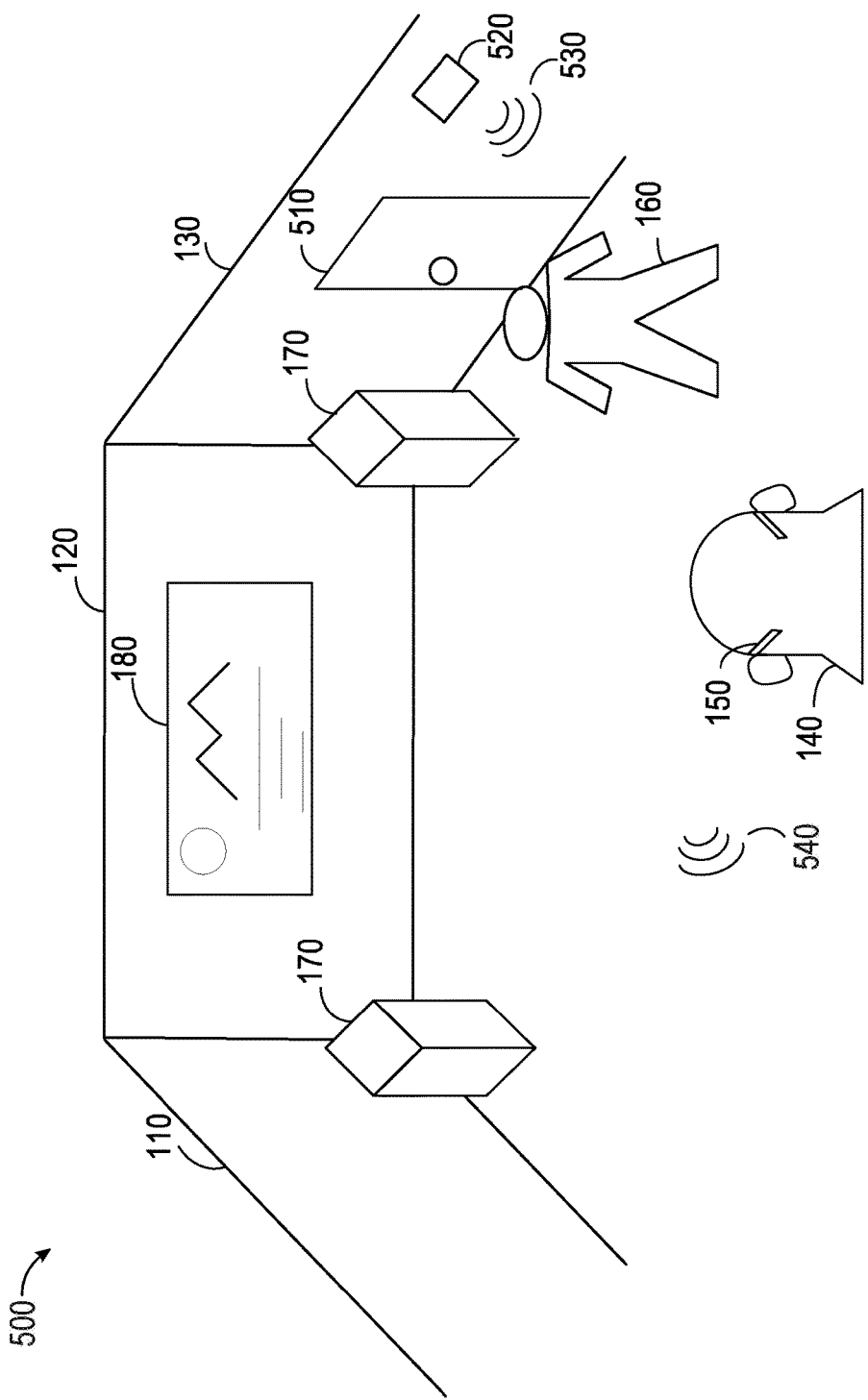
FIG. 5 illustrates one example scene and method for improving detection of environmental sounds in an immersive environment, in accordance with one or more aspects of the present application.

FIG. 5 schematic illustrates an example scene for improving detection of ambient sounds within an immersive environment, in accordance with one or more aspects of the present application. As illustrated, immersive environment 500 includes among other features, a left side wall 110, a front wall 120 supporting a display device 180, a right side wall 130, and two speakers 170. The immersive environment is generated, in FIG. 5, by the head-mounted display device 150 worn by the user 140 and includes a virtual agent 160. The example immersive environment 500 also includes a door 510 and a door chime generator 520.

In one implementation, a person at the door 510 rings the doorbell, thus causing the door chime generator 520 to generate a door chime 530. This occurs at the same time as the user 150 is interacting with the virtual agent 160 who is standing close to the door chime generator 520. The door chime sound is received by one or more microphones in the head-mounted display device and analyzed, in one implementation, to determine its source and volume. After the source is identified as a doorbell, and if the system has not received any indications that the doorbell was heard by the user 140, the system may decide, based on pre-determined policies, that the doorbell sound needs to be modified in order to improve the user's ability to hear it. This is based in part on analyzing the volume and frequency of the virtual agent's audio sound and determining the level of sound occlusion for the user based on both the location and volume of the virtual agent. In this case, the location and/or direction from which the output doorbell audio sound is provided is not important to the user's ability to recognize and respond to the sound. As a result, the head-mounted display 150 outputs a doorbell sound 540 which amplifies the doorbell sound 530 and changes its location so that it is not in close proximity to that of the virtual agent 160, thus potentially eliminating sound confusion. This may apply to any other virtual object or sound that occludes a real-world sound. In at least one implementation, the door chime itself may be changed to distinguish it from other virtual or real-world sounds in the environment. For example, if the user is listening to a song which includes a beat that is similar to that of the door chime, the system may change the door chime to something that can be easily distinguished from the song.

This process of modifying the doorbell also includes, in one implementation, delaying the doorbell sound. The amount delay may be minute (e.g., the amount of time it takes to process the signals and change the location of the sound before it is outputted) or it may be significant. For example, if the system determines (based at least in part, on pre-determined policies) that there is no urgency in hearing the doorbell, the system may wait until the virtual agent finishes its current sentence before generating the doorbell sound. This improves the overall experience of the user by ensuring that the user can hear both the virtual agent and the doorbell. In another example, the chime of an incoming email may be delayed until the user turns his/her head back towards the device (e.g., computer or mobile device) from which the sound originated. This may be based on policies that dictate email chimes are not urgent but they are important.

Figure 6:
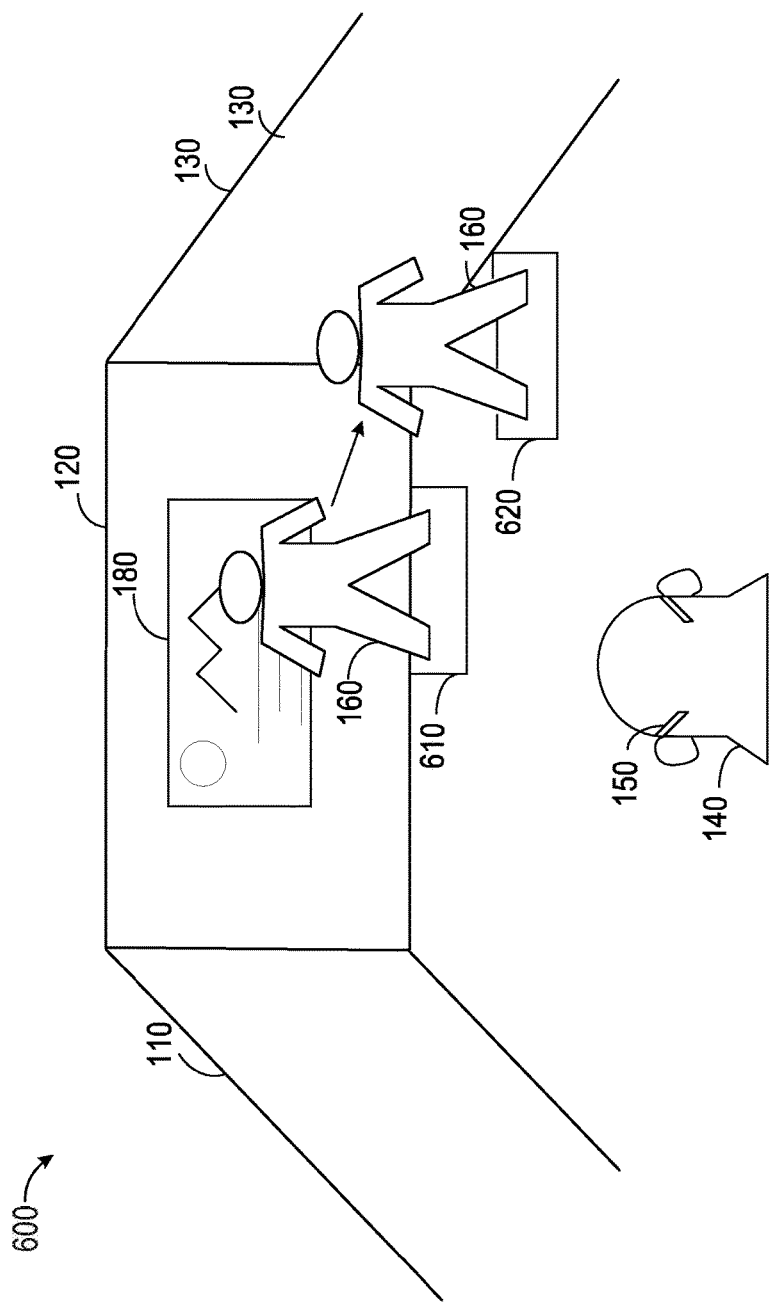
FIG. 6 illustrates another example scene and method for improving detection of environmental sounds in an immersive environment, in accordance with one or more aspects of the present application.

FIG. 6 schematic illustrates another example scene for improving detection of ambient sounds within an immersive environment, in accordance with one or more aspects of the present application. As illustrated, immersive environment 600 also includes, among other features, a left side, wall 110, a front wall 120 supporting a display device 180, and a right side wall 130. The immersive environment is generated, in FIG. 6, by the head-mounted display device 150 worn by the user 140 and includes a virtual agent 160. As can be seen, in this example environment, the virtual agent 160 is standing in front of the display device 180 at a location 610. In one implementation, the pre-determined policies may dictate that the display device 180 has a higher priority than the virtual agent. In such an instance, if the virtual agent 160 is speaking and/or interacting with the user 140, when all of a sudden the display device 180 is turned on or its volume increased (e.g., by a predetermined level), the virtual agent 160 may be moved from its current location 610 to a new location 620 to eliminate or reduce occlusion of the display device 180. In at least one implementation, even if the display device 180 is not determined to have a higher priority, the virtual agent 160 is still moved to reduce confusion with the TV sound and to prevent sound and visual occlusion. This will allow the user 140 to watch what is being displayed on the display device 180, while still interacting with the virtual agent 160. In this manner, the virtual display signals are modified to enhance the user's overall experience in the immersive environment. Alternatively, if the policies dictate that the virtual agent takes precedent over the TV, volume of the virtual agent's voice may be increased in a similar manner as a normal human would do in this situation to mask the TV behind the virtual agent. In yet another example, the user may have the option of asking the virtual agent to be quiet while he/she watches a certain program on the display device 180, in which case the virtual agent 160 may become silent and move to the side to prevent audio and visual occlusion. Alternatively, the system may detect that the user is focusing on the display device 180 as opposed to the virtual agent 160 and may move and/or silence the virtual agent 160 until the user's attention is returned to the virtual agent 160. In such a system, priorities are, changed dynamically as the user engages with the immersive environment.

Figure 7:
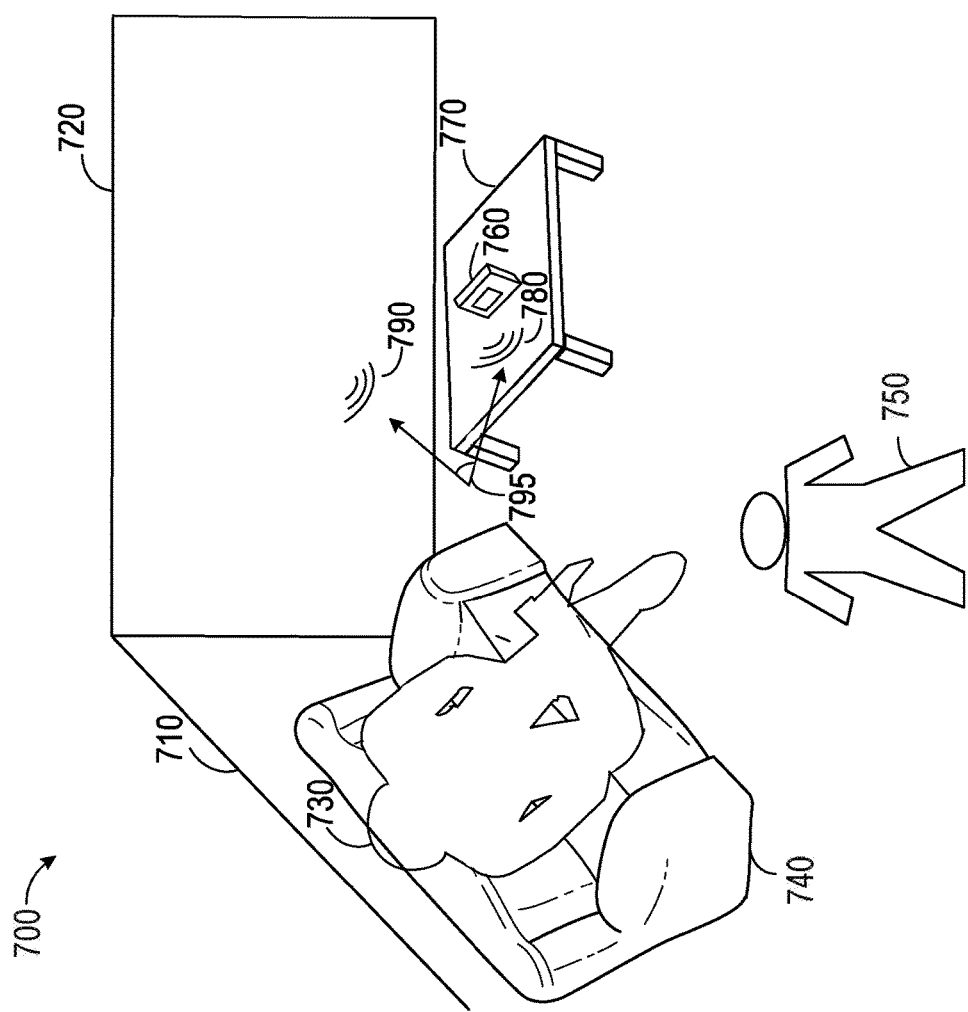
FIG. 7 illustrates a third example scene and method for improving detection of environmental sounds in an immersive environment, in accordance with one or more aspects of the present application.

FIG. 7 schematic illustrates another example scene for improving detection of ambient sounds within an immersive environment, in accordance with one or more aspects of the present application. As illustrated, immersive environment 700 includes, among other features, a left side wall 710, a front wall 720, and a couch 740 for allowing a user 730 to sit. The immersive environment is generated, in FIG. 7, by a head-mounted display device worn by the user 730 (not shown) and includes a virtual agent 750. The environment 700 also includes a table 770 containing an infant monitoring device 760.

In this example environment, the user 730 is facing and interacting with the virtual agent 750, when the infant monitoring device 760 generates an audio sound 780. Because the infant monitoring device is granted high priority and the system knows that the user's perceptual accuracy is low at this point, the system may determine that it is not enough to merely amplify the sound. In this case, the location of the sound is also important as it helps direct the user's attention to the screen of the infant monitoring device. In order to ensure that the sound 780 is identified by the user 730 and traced back to its' correct location, the system may generate an amplified version of the sound 780 as sound 790 at a location which is a certain angle away from the original location. For example, if the sound 780 was located at a 90 degree angle from the user 730, the system may output the sound 790 at a location with an angle of 795 with respect to the original sound location (e.g., 130 degrees with respect to the user). This causes the user to turn his head towards the new angle. When he does, the sound snaps back to its original location, so the user is focusing on the right source. This is because the system is highly resolute in the forward direction where the user is looking. By changing the angle, the system creates more separation from the virtual agent 750, thus increasing the likelihood that the user will notice the sound.

Apparatuses and methods of improving a user's experience in an immersive environment are described. Methods can include receiving an audio signal from an ambient environment, analyzing the received audio signal to identify one or more parameters for the received audio signal, determining a classification level based at least in part on one of the one or more identified parameters of the received audio signal and one or more predetermined policies, determining, at least in part based on the classification level, if an adjustment is needed in the immersive environment to improve the user's experience, and adjusting a relationship between a virtual agent in the immersive environment and at least one of the one or more parameters.

In one implementation, one or more identified parameters include a volume of the received audio signal. In at least one such implementation, adjusting the relationship between a virtual agent and one of the one or more parameters includes adjusting the volume of the received audio signal with respect to a volume of the virtual agent. In another such implementation, adjusting the relationship between a virtual agent and one of the one or more parameters includes adjusting the volume of the virtual agent with respect to the volume of the received audio signal.

In one embodiment, at least one of the one or more identified parameters includes a source for the received audio signal. In at least one such implementation, adjusting the relationship between a virtual agent and one of the one or more parameters includes adjusting changing a location of the virtual agent with respect to a location of the source of the received audio signal.

In one implementation, disclosed methods may also include providing an output audio signal to the user based in part on the received audio signal and the adjusted relationship. In one such implementation, the output audio signal is provided to the user with a time delay with respect to the received audio signal. In one such embodiment, disclosed methods may also include recording the received audio signal. In another implementation, adjusting the relationship includes outputting the output audio signal from a location that is different from of a location of a source of the received audio signal. In one embodiment, the location from which the output audio signal is outputted is further away from a location of the virtual agent than the location of the source of the received audio signal and wherein once the user turns their head towards the location of the output audio signal, the location of the output audio signal is returned back to the location of the source of the received audio signal.

In at least one implementation, disclosed methods can include receiving an audio signal from an ambient environment, analyzing the received audio signal to identify one or more parameters for the received audio signal, receiving a sensor signal from the ambient environment, accessing a policy database to identify one or more policies related to at least one of the one or more parameters or the received sensor signal, determining, at least in part based on the identified policy, if an adjustment is needed in the immersive environment to improve the user's experience, and adjusting a relationship between a virtual agent in the immersive environment and at least one of the one or more parameters. In one embodiment, the method also includes analyzing the received sensor signal to identify at least one of an object or a person in the immersive environment. In another embodiment, the method further includes decomposing an auditory field of a real-world environment surrounding the immersive environment based at least in part on historical information. In one embodiment, the sensor signal includes an image, a video, accelerometer data, motion information, or location data.

Disclosed apparatuses include an apparatus that includes a microphone for receiving an audio signal, a display panel for displaying a virtual agent, a speaker for transmitting an output audio signal, a processing unit, and a memory. In one embodiment, the memory is readable by the processing unit and includes instructions stored on it that can cause the processing unit to receive an audio signal from an ambient environment, analyze the received audio signal to identify one or more parameters for the received audio signal, determine a classification level based at least in part on one of the one or more identified parameters of the received audio signal and one or more predetermined policies, determine, at least in part based on the classification level, if an adjustment is needed in the immersive environment to improve the user's experience, and adjust a relationship between a virtual agent in the immersive environment and at least one of the one or more parameters.

In one embodiment, the predetermined policies are stored in the memory. In another implementation, the processing unit includes an audio processing unit and a sensor processing unit. Additionally, the processing unit may also include a virtual data processing unit.

In one embodiment, disclosed apparatuses may also include a sensor for receiving data about a real-world environment surrounding the apparatus. The sensor may include a camera, an accelerometer, and a motion sensor.

Generally, functions described herein (for example, the features illustrated in FIGS. 3-7) can be implemented using software, firmware, hardware (for example, fixed logic, finite state machines, and/or other circuits), or a combination of these implementations. The modules shown separately in FIG. 3 may or may not be implemented as separate modules. In the case of a software implementation, program code performs specified tasks when executed on a processor (for example, a CPU or CPUs). The program code can be stored in one or more machine-readable memory devices. The features of the techniques described herein are platform-independent, meaning that the techniques may be implemented on a variety of computing platforms having a variety of processors. For example, implementations may include an entity (for example, software) that causes hardware to perform operations, e.g., processors functional blocks, and so on. For example, a hardware device may include a machine-readable medium that may be configured to maintain instructions that cause the hardware device, including an operating system executed thereon and associated hardware, to perform operations. Thus, the instructions may function to configure an operating system and associated hardware to perform the operations and thereby configure or otherwise adapt a hardware device to perform functions described above. The instructions may be provided by the machine-readable medium through a variety of different configurations to hardware elements that execute the instructions.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows, and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein.

Relational terms such as first and second and the like may be used solely to distinguish one entity or action from another without necessarily requiring or implying any actual such relationship or order between such entities or actions. The terms "comprises," "comprising," and any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

The Abstract of the Disclosure is provided to allow the reader to quickly identify the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that any claim requires more features than the claim expressly recites. Rather, as the following claims reflect, inventive subject matter lies in less than all features of a single disclosed example. Thus the following claims are hereby incorporated into the Detailed Description, with each claim standing on its own as a separately claimed subject matter.

What is claimed is:

1. A method of improving a user's experience in an immersive environment comprising:
   receiving an audio signal from an ambient environment;
   recording the received audio signal;
   analyzing the received audio signal to identify one or more parameters for the received audio signal;
   accessing a policy database to determine if there are one or more policies in the policy database that are relevant to the audio signal being processed based at least in part on one of the identified one or more parameters;
   determining a classification level for the received audio signal based at least in part on one of the one or more identified parameters of the received audio signal and at least one of the one or more policies;
   determining, at least in part based on the classification level for the received audio signal, if an adjustment is needed in the immersive environment to improve the user's experience; and
   upon determining the adjustment is needed, adjusting a relationship between at least one parameter of a virtual agent in the immersive environment and at least one of the identified one or more parameters.

2. The method of claim 1, wherein at least one of the one or more parameters comprises a volume of the received audio signal.

3. The method of claim 2, wherein adjusting the relationship includes adjusting the volume of the received audio signal with respect to a volume of the virtual agent.

4. The method of claim 2, wherein adjusting the relationship includes adjusting the volume of the virtual agent with respect to the volume of the received audio signal.

5. The method of claim 1, wherein at least one of the one or more parameters comprises a source for the received audio signal.

6. The method of claim 5, wherein adjusting the relationship includes changing a location of the virtual agent with respect to a location of the source of the received audio signal.

7. The method of claim 1, further comprising providing an output audio signal to the user based in part on the received audio signal and the adjusted relationship.

8. The method of claim 7, wherein the output audio signal is provided to the user with a time delay with respect to the received audio signal.

9. The method of claim 7, wherein adjusting the relationship includes presenting the output audio signal from a location that is different from of a location of a source of the received audio signal.

10. The method of claim 9, wherein the location from which the output audio signal is presented is further away from a location of the virtual agent than the location of the source of the received audio signal and wherein once the user turns their head towards the location from which the output audio signal is presented, the output audio signal is presented from the location of the source of the received audio signal.

11. An apparatus comprising:
   a microphone for receiving an audio signal;
   a display panel for displaying a virtual agent;
   a speaker for transmitting an output audio signal;
   a processing unit; and
   a memory readable by the processing unit and comprising instructions stored thereon to cause the processing unit to:
      analyze a received audio signal to identify one or more parameters for the received audio signal;
      record the received audio signal;
      access a policy database to determine if there are one or more policies in the policy database that are relevant to the audio signal based at least in part on one of the identified one or more parameters;
      determine a classification level for the received audio signal based at least in part on one of the one or more identified parameters of the received audio signal and at least one of the one or more policies;
      determine, at least in part based on the classification level, if an adjustment is needed to improve a user's experience; and
      upon determining that the adjustment is needed, adjust a relationship between at least one parameter of the virtual agent and at least one of the identified one or more parameters.

12. The apparatus of claim 11, wherein the processing unit includes an audio processing unit and a sensor processing unit.

13. The apparatus of claim 11, further comprising a sensor for receiving data about a real-world environment surrounding the apparatus.

14. The apparatus of claim 13, wherein the sensor comprises at least one of a camera, an accelerometer, and a motion sensor.

15. A method of improving a user's experience in an immersive environment comprising:
   receiving an audio signal from an ambient environment;
   analyzing the received audio signal to identify one or more parameters for the received audio signal;
   receiving a sensor signal from the ambient environment;
   accessing a policy database to identify one or more policies in the policy database related to at least one of the one or more parameters of the received sensor signal;
   determining, at least in part based on the identified one or more policies, if an adjustment is needed in the immersive environment to improve the user's experience; and
   upon determining that the adjustment is needed, adjusting a relationship between at least one parameter of a virtual agent in the immersive environment and at least one of the identified one or more parameters.

16. The method of claim 15, wherein the sensor signal comprises at least one of an image, a video, accelerometer data, motion information, or location data.

17. The method of claim 15, further comprising analyzing the received sensor signal to identify at least one of an object or a person in the immersive environment.

18. The method of claim 15, wherein identifying at least one of the one or more parameters includes identifying a source for the audio signal by employing a voice recognition algorithm.

19. The method of claim 15, further comprising decomposing an auditory field of a real-world environment surrounding the immersive environment based at least in part on historical information.

* * * * *